United States Patent [19]
Lee et al.

[11] Patent Number: 5,408,545
[45] Date of Patent: Apr. 18, 1995

[54] DEPOLARIZER FOR FIBER OPTIC APPLICATIONS AND METHOD USING SAME

[75] Inventors: Ho-Shang Lee, El Sobrante; Jer-Chen Kuo; Wujun Zhou, both of Berkeley, all of Calif.

[73] Assignee: Dicon Fiberoptics, Berkeley, Calif.

[21] Appl. No.: 183,661

[22] Filed: Jan. 19, 1994

[51] Int. Cl.$^6$ ............................ G02B 6/10; G02B 6/16
[52] U.S. Cl. ........................................ 385/11; 385/27; 385/31; 385/32; 385/39; 359/483; 359/484; 359/494
[58] Field of Search ........................ 385/11, 12, 24, 27, 385/28, 31, 32, 39, 46, 47, 48, 38, 42, 88, 89; 359/122, 123, 483, 484, 494, 495

[56] References Cited

U.S. PATENT DOCUMENTS

| | | | |
|---|---|---|---|
| 4,793,678 | 12/1988 | Matsumoto et al. | 385/11 X |
| 4,988,169 | 1/1991 | Walker | 385/11 X |
| 5,113,458 | 5/1992 | Taylor | 385/11 |
| 5,115,480 | 5/1992 | Large | 385/11 X |
| 5,117,469 | 5/1992 | Cheung et al. | 385/11 |
| 5,159,481 | 10/1992 | Maeda | 385/11 X |
| 5,297,223 | 3/1994 | van Deventer | 385/11 X |
| 5,337,375 | 8/1994 | Nyman et al. | 385/11 |
| 5,343,550 | 8/1994 | Egalon et al. | 385/123 |
| 5,351,124 | 9/1994 | Laskoskie et al. | 385/11 X |

OTHER PUBLICATIONS

H. C. Lefevre, "Electronic Letters," Sep. 25, 1980, vol. 16, No. 20, pp. 778–781.
Marcus W. Shute, Sr., Mickey R. Reynolds, "Optical Fibers for Tethered Vehicle Applications: . . . ," 1990, Reprinted from the 39th International Wire & Cable Symposium, pp. 105–111.
M. W. Maeda, D. A. Smith, "New Polarization-Insensitive Direction Scheme Based on Fibre Polarisation Scrambling," Oct. 15, 1990, pp. 10–12.

*Primary Examiner*—Brian Healy
*Attorney, Agent, or Firm*—Majestic, Parsons, Siebert & Hsue

[57] ABSTRACT

A technique for causing the distribution of the state of polarization of an optical signal carried in a single-mode optical fiber to be substantially diversified over a time interval. When such a depolarized optical signal is fed into an optical detector, the polarization dependent loss (PDL) of the optical signal attributable to the detector is thereby normalized. By normalizing the PDL attributable to the detector, it is then possible to more accurately measure any PDL of the optical signal attributable to the optical signal passing through an optical device under test.

22 Claims, 6 Drawing Sheets

DEPOLARIZER FOR FIBER OPTIC APPLICATIONS AND METHOD USING SAME

BACKGROUND OF THE INVENTION

The present invention relates generally to optical fibers, and in particular, to optical fibers or other polarization-dependent elements connected with optical fibers.

Optical fibers are quickly replacing copper cable as the transmission medium for communication systems, such as the long-distance and local telephone networks and as interconnects within a computer system. The extremely wide band width of optical fibers allows the optical carrier to be modulated at very high data rates.

In addition, the absorption of optical fibers has been reduced to a point where an optical signal can propagate for hundreds of kilometers on an optical fiber without the need for intermediate amplification or regeneration. However, the combination of long distance and high data rates presents new problems in the field of fiber optic communications.

One such problem relates to the polarization dependent loss (PDL) of an optical signal. Polarization dependent loss is the dependence of insertion loss on the state of polarization (SOP) of an input optical light signal. In fiber optic communication, the state of polarization of the light traveling in a fiber optic line must be taken into account. Since semiconductor laser diodes emit light having a specific polarization direction, the performance of many fiber optic components in the system depends on the SOP of the light at their input.

Figure 1:
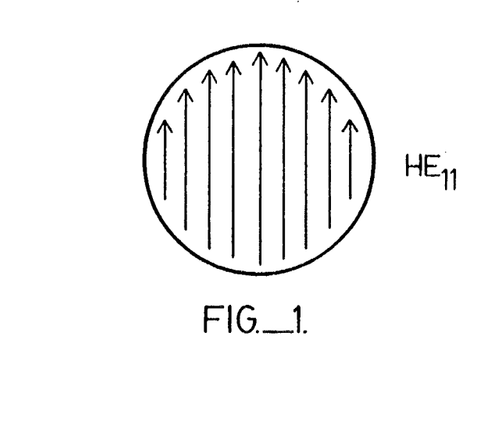
FIG. 1 is a cross-sectional view of an optical fiber showing an electric field vector of an optical signal within the fiber, wherein the electric field is said to be polarized in the vertical direction.

Typically, in fiber optic communication systems, single-mode fibers are used to carry the optical signals. In a single-mode fiber, the optical energy propagates along the fiber path according to one particular mode (hence the name "single-mode" fiber). The electric vector (E) of the mode of the optical signal is in a particular direction orthogonal to the propagation direction. FIG. 1 illustrates this principle, wherein a cross section of an optical fiber is shown. In the example of FIG. 1, the optical fiber is carrying an optical signal which has an electric field vector (E) that is said to be polarized in the vertical direction. As known to those skilled in the art, there is implicitly a possible second electric field at 90 degrees, a horizontally polarized component that is degenerate with the electric field shown in FIG. 1. That is to say, any polarized wave can be composed of a linear combination of two orthogonal waves. Thus, what is normally a so-called "single-mode" fiber can actually be decomposed into two degenerated modes, constituting the $E_x$ and $E_y$ components of the electric vector E.

It turns out that if the single-mode fiber is not completely circularly symmetric or if it contains stress or inhomogeneities then the phase velocities for the $E_x$ and $E_y$ components of the electric field will be slightly different. Such fibers are called "birefringent".

Figure 2:
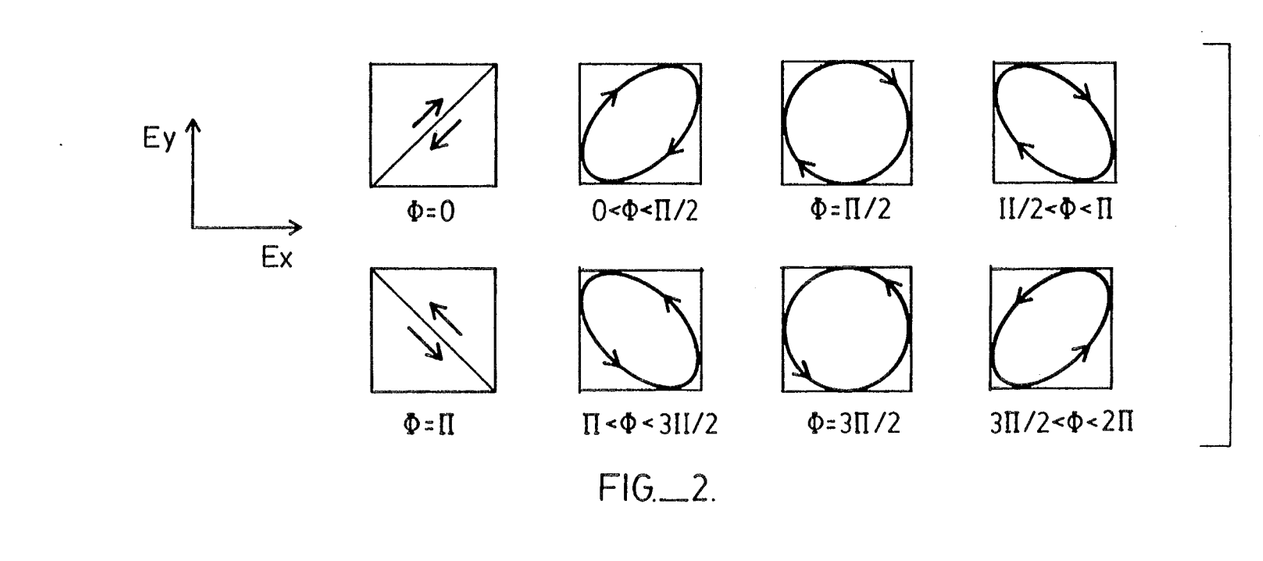
FIG. 2 graphically illustrates the change in the state of polarization of the electric field based upon the phase difference ($\Phi$) between the vertical ($E_y$) and the horizontal ($E_x$) components of the electric field.

Birefringent fibers are very common since, as light travels along a long fiber, it will inevitably encounter small imperfections such as bends and inhomogeneities that are not all circularly symmetric and therefore will affect light of the two polarizations $E_x$ and $E_y$ differently. For short distances, such effects would not be noticed, but over many meters or kilometers of fiber that is never completely circular in cross section and never without small inhomogeneities and bends, they become important. The combined effect of the birefringence due to non-ideal circular symmetry and the small discontinuities in the fiber is to produce a situation in which light launched with a particular SOP will, in general, change its SOP gradually along the fiber optic path. FIG. 2 graphically illustrates the change of SOP with respect to the phase difference ($\Phi$) between the $E_x$ and $E_y$ components of the optical signal's electric field (E).

In the present state of optical fiber technology, there is no control in long fibers over the distribution of the optical power between the two polarization modes $E_x$ and $E_y$. As a fiber goes around a bend, the fiber becomes birefringent, and a previously well defined single polarization mode is transformed into a combination of the two polarization modes. Indeed, the transformations between the two modes appear to depend upon uncontrolled environmental factors which change over time. Therefore, the light wave arriving at the receiver is of unknown, uncontrolled, and temporarily varying polarization. The lack of polarization control would present no problem if the fiber optic components of the system were polarization insensitive. However, as stated previously, many optical components exhibit polarization dependent loss (PDL) of the optical signal.

The PDL for the majority of fiber optic components typically ranges from 0.05 to 0.3 Db. As the requirements of the fiber optic system become more stringent with time, accurate PDL measurements for the fiber optic components becomes more important. Unfortunately, most photo-detectors for optical power measurement are also polarization sensitive. The detector response typically has a 0.04 to 0.08 Db associated with a change in SOP. This measurement uncertainty is a serious hurdle for accurate PDL measurements of fiber optic components because the measurement uncertainty due to the detector is of the same order of magnitude as the PDL for the fiber optic components themselves.

In order to determine the PDL for a particular optical device under test, the optical signal in which the PDL occurs must be measured by some type of optical detector. However, the detector is also sensitive to the SOP of the optical signal at its input, meaning that the optical signal will undergo a second PDL attributable to the detector. Thus, when measuring the PDL for a particular optical device under test, the measured PDL value will include a first PDL component attributable to the optical device under test (which is precisely what is desired to be measured) and an uncertainty component attributable to the PDL of the detector. Moreover, this uncertainty component will be of the same order of magnitude as the first PDL component, thereby making it extremely difficult to accurately measure the PDL attributable solely to the optical device under test.

In light of this problem, it is a primary objective of the present invention to provide a technique for improving the measurement accuracy of the PDL attributable to a particular optical device under test.

SUMMARY OF THE INVENTION

This and other objectives are accomplished by the various aspects of the present invention, wherein, briefly, according to a principal aspect, the distribution of the state of polarization of the optical signal being input into the optical detector is substantially diversified over a time interval to thereby normalize the PDL attributable to the detector. By normalizing the PDL attributable to the detector, it is then possible to accurately measure the PDL attributable to the optical device under test.

In accordance with this principal aspect, a first aspect of the present invention is directed to an apparatus for randomizing the SOP of an optical signal carried in an optical fiber. The apparatus comprises a state of polarization randomizing device connected to the optical fiber for continuously inducing changing stress in the fiber sufficient to continuously and randomly alter the state of polarization of the optical signal within the fiber such that the distribution of the state of polarization of the optical signal is substantially diversified over a time interval which is measurable by an optical detector.

A second aspect of the present invention is directed to a method for randomizing the state of polarization of an optical signal carried in an optical fiber comprising the steps of forming a plurality of bends in at least a portion of the optical fiber and continuously inducing motion in at least a portion of the plurality of bends sufficient to continuously and randomly alter the state of polarization of the optical signal within the optical fiber such that the distribution of the state of polarization of the optical signal is substantially diversified over a time interval which is measurable by an optical detector.

A third aspect of the present invention is directed to an apparatus for improving the measurement accuracy of a PDL associated with a device under test. The apparatus comprises a state of polarization randomizing device connected to an optical fiber which carries the optical signal from the device under test to an optical detector. The randomizing device induces stress in the fiber sufficient to continuously and randomly alter the state of polarization of the optical signal such that the distribution of the state of polarization of the optical signal is substantially diversified over a time interval, thereby normalizing the polarization dependent loss attributable to the detector in order to more accurately measure the polarization dependent loss attributable to the device under test.

A fourth aspect of the present invention is directed to a method for improving the measurement accuracy of a PDL associated with a device under test. The method comprises the step of inducing changing stress in an optical fiber, which carries an optical signal from the device under test to a detector, sufficient to continuously and randomly alter the state of polarization of the optical signal such that the distribution of the state of polarization of the optical signal is substantially diversified over a time interval. This technique normalizes the polarization dependent loss attributable to the detector, which allows for a more accurate measurement of the polarization dependent loss attributable to the device under test.

Additional objects, features, and advantages of the various aspects of the present invention will become apparent from the following description of its preferred embodiment, which description should be taken in conjunction with the accompanying drawings.

DETAILED DESCRIPTION OF THE PREFERRED EMBODIMENT

The invention is to randomize, diversify, or scramble the polarization states of light in an optical fiber. The invention can be used to reduce the uncertainty of the optical power measurement caused by the polarization-dependent performance of the optical detector. According to the technique of the present invention, the polarization state of the optical signal which is received by the detector is randomized or diversified during an integration time of the detector.

The randomization of the state of polarization of the optical signal within an optical fiber is achieved by random or periodic excitation of a plurality of fiber coils using a number of different techniques, such as, for example, by using fluid dynamic means separately, or in combination with, periodic vibratory motions. The techniques used for achieving random or periodic excitation of the plurality of fiber coils are discussed in greater detail below.

As discussed previously, light traveling down a birefringent fiber will change its state of polarization gradually along the fiber optic path. Several methods such as, for example, twist, stress with electromagnetics, and use of asymmetric fibers can be used to produce birefringence. An effective method of producing birefringence is taught by H. C. Lefevre, *Electronic Letters*, Sep. 25, 1980, Volume 16, Number 20, Pages 778-781, herein incorporated by reference in its entirety. The method, as pointed out by Lefevre, is to create birefringence by bending. Non-uniform stress is induced across the fiber cross section by bending, and therefore produces birefringence. The bent coil behaves analogous to a classical fractional wave plate. Based on the bend radius and photo-elastic properties of the fiber, any fraction wave plate, such as a quarter or half wave plate, can be easily produced. Lefevre's method is used to adjust the SOP in the fiber to arrive at a particular and desired SOP. Thus, the SOP in the up-stream end of the fiber can be transformed to another SOP at the output end of the devise in a definite manner.

Rather than attempting to control and maintain a particular SOP of an optical signal, as taught by Lefevre, the present invention makes the state of polarization at the output end of the optical fiber as disorderly as possible. In other words, the present invention is used to make the instantaneous SOP at the output of the optical fiber as random as possible so that over a short integration time this output will have no preferred polarization. To achieve this, the present invention utilizes various techniques of randomly twisting a plurality of fiber coils by fluid dynamic means as well as by periodic vibratory motions.

Figures 3A, 3B:
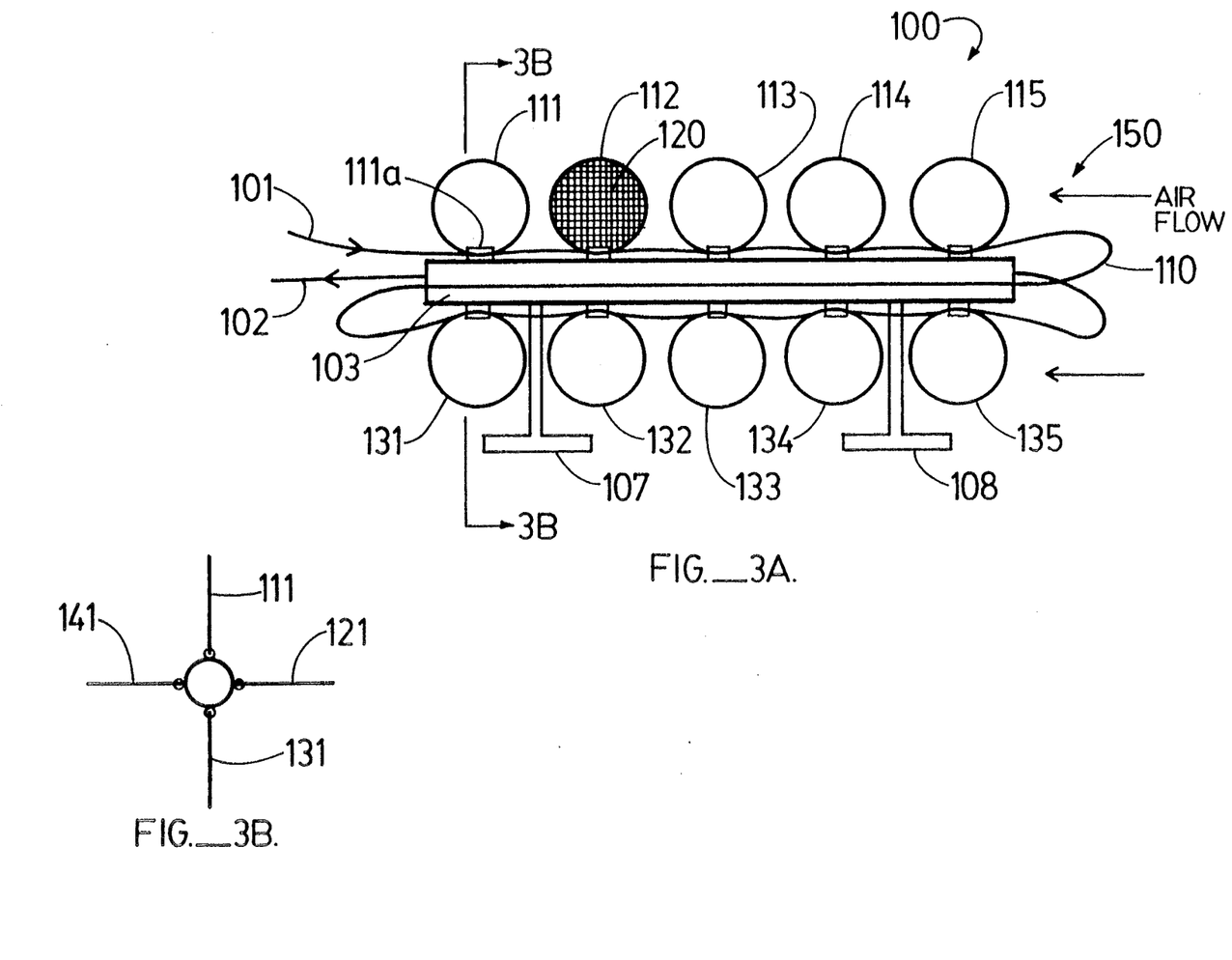
FIG. 3A illustrates one embodiment of the present invention for randomizing the state of polarization of the optical signal within the optical fiber.
FIG. 3B is an illustration of the embodiment of FIG. 3A taken along the line 3B.

FIG. 3A illustrates one embodiment of the present invention for randomizing the SOP of an optical signal within an optical fiber 110. As shown in FIG. 3A, fiber 110 is wrapped into multiple coils, illustrated for example as five coils 111, 112, 113, 114, and 115, together forming one line of coils. The embodiment of FIG. 3A includes additional lines of coils, one line of which is represented by coils 131-135. Together, four lines of coils, 111-115, 121-125, 131-135, 141-145, are included in the embodiment of FIGS. 3A and 3B. These four lines of coils are configured quadratically as shown in FIG. 3B. It is to be understood, however, that the present invention may include additional or fewer lines of coils than those shown FIGS. 3A and 3B. Additionally, the present invention may comprise coils which are non-linearly configured, so long as the coils which are formed can be used to randomly alter the SOP of the optical signal within the optical fiber 110.

Referring to FIG. 3A, the optical signal enters the input end 101 of the fiber 110, and leaves at the output end 102 after having passed through the plurality of fiber coils or bends.

To form each fiber coil, fiber 110 is threaded through a piece of tubing 111a in the manner shown in FIG. 3A. Alternatively, fiber 110 may be wrapped around a hinged circular shaft (not shown) which is movably connected to shaft 103. Each coil such as, for example, coil 111 may include one or more individual loops. Each loop may be of a different diameter. The loops may be of different shapes, for example, circular or ovular. The phase difference between the $E_x$ and $E_y$ components of the optical signal depends upon the diameter of the loop. A quarter wave plate has a phase difference of 90 degrees. It is preferable for some or all of the loops or coils to include a sufficient amount of turns to form quarter or half wave plates. This helps to disperse the SOP of the optical signal more effectively with minimum plates. In addition, it is preferable to form a plurality of fiber coils which includes four or more individual coils such as coil 111.

Each of the fiber coils is then connected to the surface of a shaft 103. This may be accomplished either by securing the fiber 110 directly to the shaft 103, or by connecting each of the tubing portions 111a to shaft 103, thereby securing in place each of the fiber coils along shaft 103. The shaft 103 is supported by two feet 107 and 108, respectively.

In the preferred embodiment, a special type of optical fiber is used so as to reduce the bend-induced loss of the optical signal within the fiber. Such a fiber can be either a depressed-clad fiber, such as the AT&T AccuTher fiber or Corning Payout Fiber, or a matched-clad fiber, or any other type of fiber which exhibits extremely high resistance to bend-induced attenuation. Additionally, the preferred fiber used in the present invention is a single mode fiber.

After the apparatus of the present invention has been constructed in accordance with FIGS. 3A and 3B, motion is induced in each of the fiber coils using fluid dynamic means such as, for example, gas or liquid. In FIG. 3A, an airflow 150 blows the coils axially along shaft 103. Due to the instability of the flow, each of the coils is vibrated or moved randomly or quasi periodically.

As airflow 150 blows past the coils axially along shaft 103, each of the coils will start to move or flap as the eddys of air current push each of the coils from side to side. In this way, each of the coils is vibrated randomly or quasi periodically. It is desirable therefore that airflow 150 be sufficiently strong and oriented in the proper direction to generate unstable or turbulent air currents at or near each of the coils to cause each of the coils to move or vibrate in a random or quasi periodic motion.

To further induce motion in each of the coils, a drag enhancing member 120 may be attached to at least a portion of the plurality of coils. The member 120 should preferably be made from a light-weight material which restricts the flow of fluid passing through it, thereby enhancing the drag force exerted on the coils whenever airflow 150 blows past them. As illustrated in FIG. 3A, member 120 is fitted into the body of loop 112. This, in turn, will cause loop 112 to move more frequently as the currents of air pass by loop 112 and act perpendicularly upon member 120, causing the loop to move from side to side.

Figure 4:
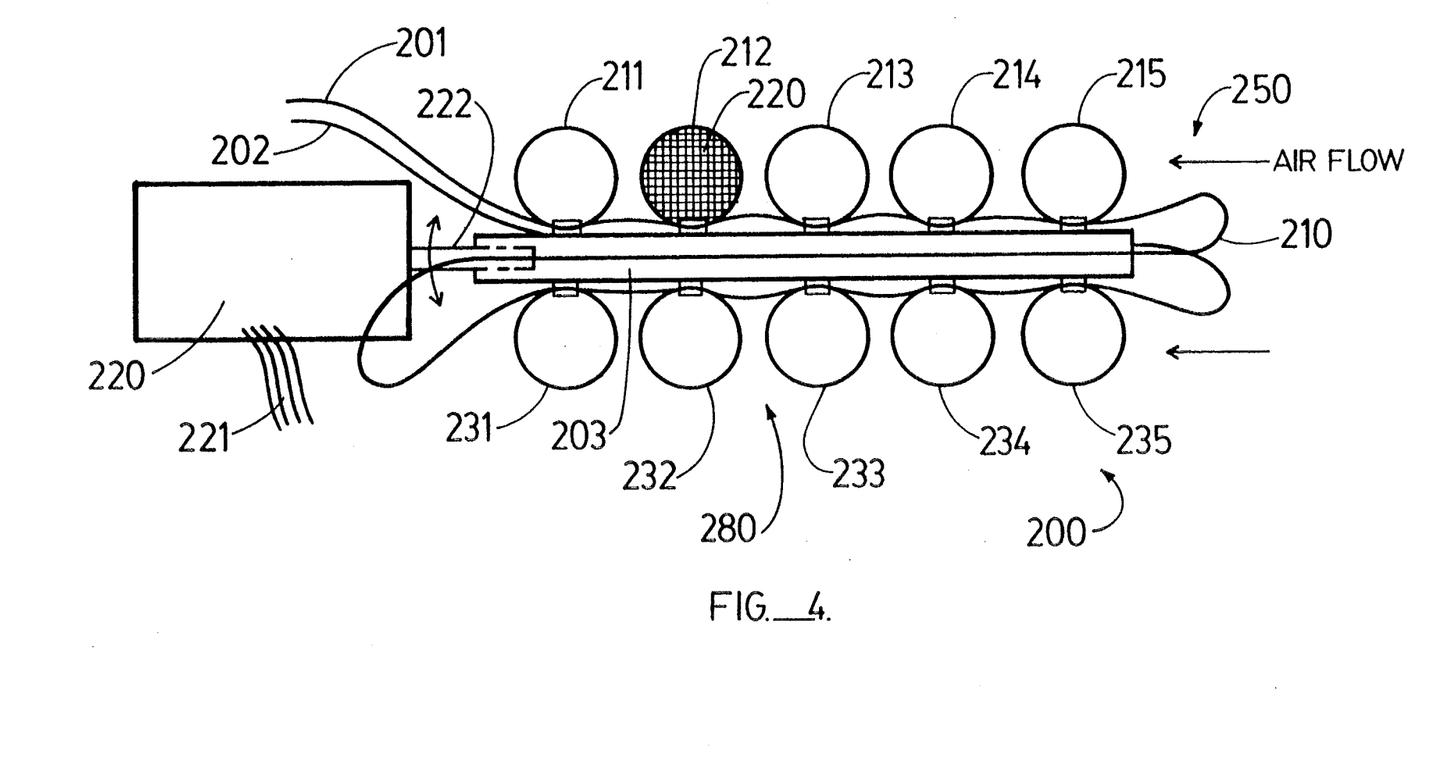
FIG. 4 is an illustration of a second embodiment of the present invention for randomizing the state of polarization of an optical signal within an optical fiber.

FIG. 4 shows a second embodiment of the present invention for randomizing the state of polarization of an optical signal within an optical fiber. The embodiment of FIG. 4 is similar to that of FIG. 3A in that four lines of coils, 211-215, 221-225, 231-235 and 241-245 are positioned around shaft 203 and connected to it. All coils are wound from a single segment of optic fiber 210 without any optical disruption. Fiber end 201 is the input end of the depolarizer 200, and fiber end 202 is the output end of the depolarizer 200. The full fiber architecture is denoted by item 280 in FIG. 4.

Shaft 203 is mounted to the shaft 222 of motor 220. The motor 220 is controlled to continually rotate back and fourth. An example of motor 220 is a DC motor, an AC motor, a stepping motor, or any other motor that can produce back and forth turning of the shaft 203 to thereby oscillate the fiber architecture 280 periodically. Such motors are generally known to those skilled in the art.

During the oscillation of the fiber architecture 280 by motor 220, the plurality of coils are also jiggled because of instability induced by the air-drag force on the coils. This random vibration is super-imposed on top of the periodic oscillation of the motor to enhance the dispersion of the state of polarization of the optical signal within fiber 210. Additionally, as discussed above, the drag force on the coils can be enhanced by attaching a fluid collecting member 220 to at least a portion of the fiber coils, as illustrated in FIG. 4. Furthermore, an air flow 250 blowing axially along the shaft 203 can also be used to increase the random motion of the coils.

Figure 5A:
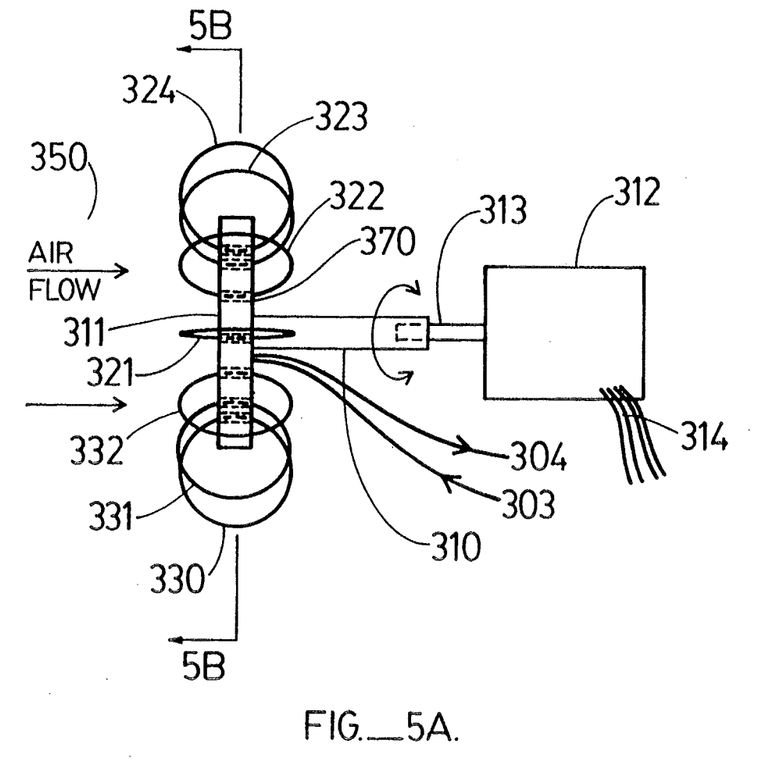
FIG. 5A is a third embodiment of the present invention for randomizing the state of polarization of an optical signal within an optical fiber.

FIG. 5A is a third embodiment of the present invention for randomizing the state of polarization of an optical signal within an optical fiber. The concept illustrated in FIG. 5A is similar to that of FIG. 4, except that fiber coils 321-332 are situated circumferentially around plate 311. The coils may be attached to the plate 311 by any of the techniques described above, or alternatively, through holes 370 may be formed in plate 311 and the optical fiber threaded through the holes to form the plurality of coils as shown in FIG. 5A.

Figure 5B:
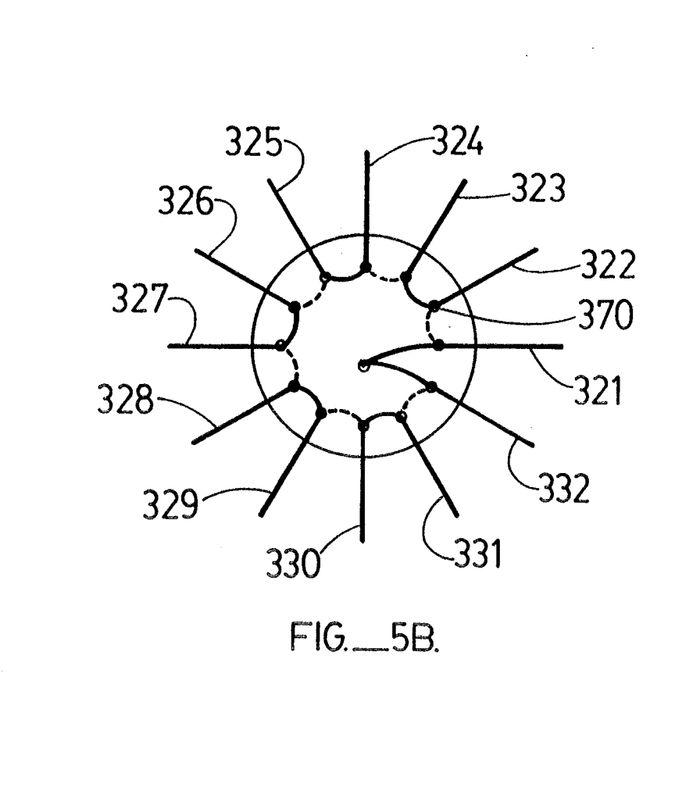
FIG. 5B is an illustration of the embodiment of FIG. 5A taken along the line 5B.

Plate 311 is connected to a motor 312 through a shaft 310. The motor 312 is used to provide the oscillatory motion for the fiber coils. When the motor 312 is activated, plate 311 will begin to turn back and forth, causing the plurality of coils 312-332 to also vibrate back and forth. Furthermore, an air flow 350 blowing axially along shaft 310 can be used to enhance the random motion of the coils. A cross section of the embodiment of FIG. 5A is illustrated in FIG. 5B.

Figure 6:
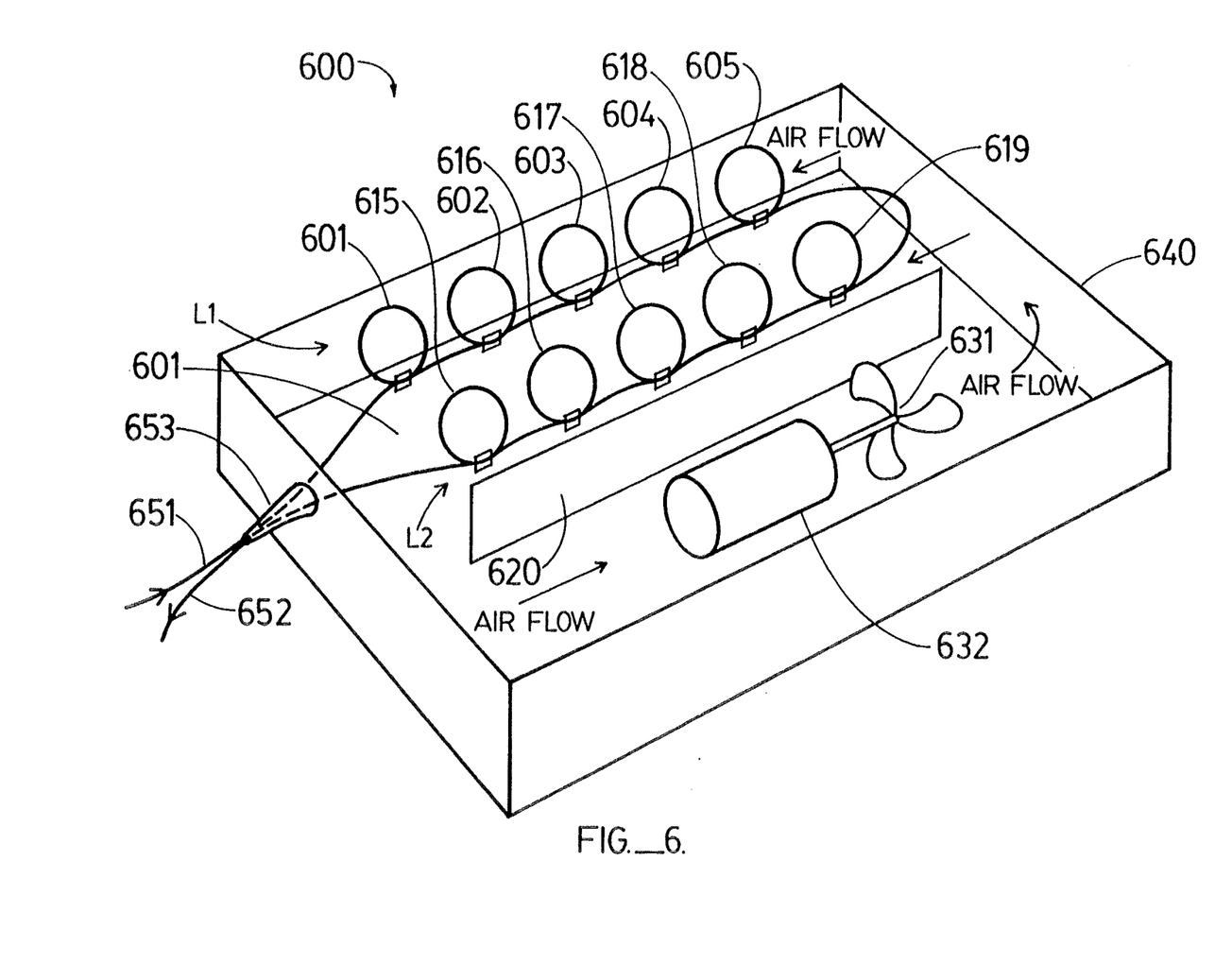
FIG. 6 is an illustration of a fourth embodiment of the present invention for randomizing the state of polarization of an optical signal within an optical fiber.

FIG. 6 is a perspective view of a fourth embodiment of the present invention. In the embodiment illustrated in FIG. 6, two rows of fiber coils, L1 and L2, are configured in parallel and attached to the base plate 601 of enclosure 640. L1 comprises five fiber coils 601-605, and L2 comprises five fiber coils 615-619. The number of coils depicted in FIG. 6 is chosen for illustrative purposes only. Additional or fewer number of coils may be used, however, it is preferable to use at least four coils in order to assure proper randomization of the optical signal.

Facing against the fiber coils is a motor 632 with a fan 631 attached. The fan 631 is used to generate the air flow within the enclosure. A partition 620 is located between the fiber coils and the motor assembly 632. This partition is used to produce a closed circulating flow inside the enclosure 640.

In general, the air flow illustrated in FIG. 3, 4, 5, and 6 can be replaced by a liquid flow. In such a situation, the fiber coils are immersed in the liquid and the full depolarizer apparatus is contained in an enclosure to prevent the liquid from escaping. The fluid flow can be driven, for example, by a pump or a propeller. Preferably a non-corrosive liquid is used. The function of the liquid fluid flow is the same as that of the gas fluid flow, that is, to cause the fiber coils to vibrate randomly.

Figure 7:
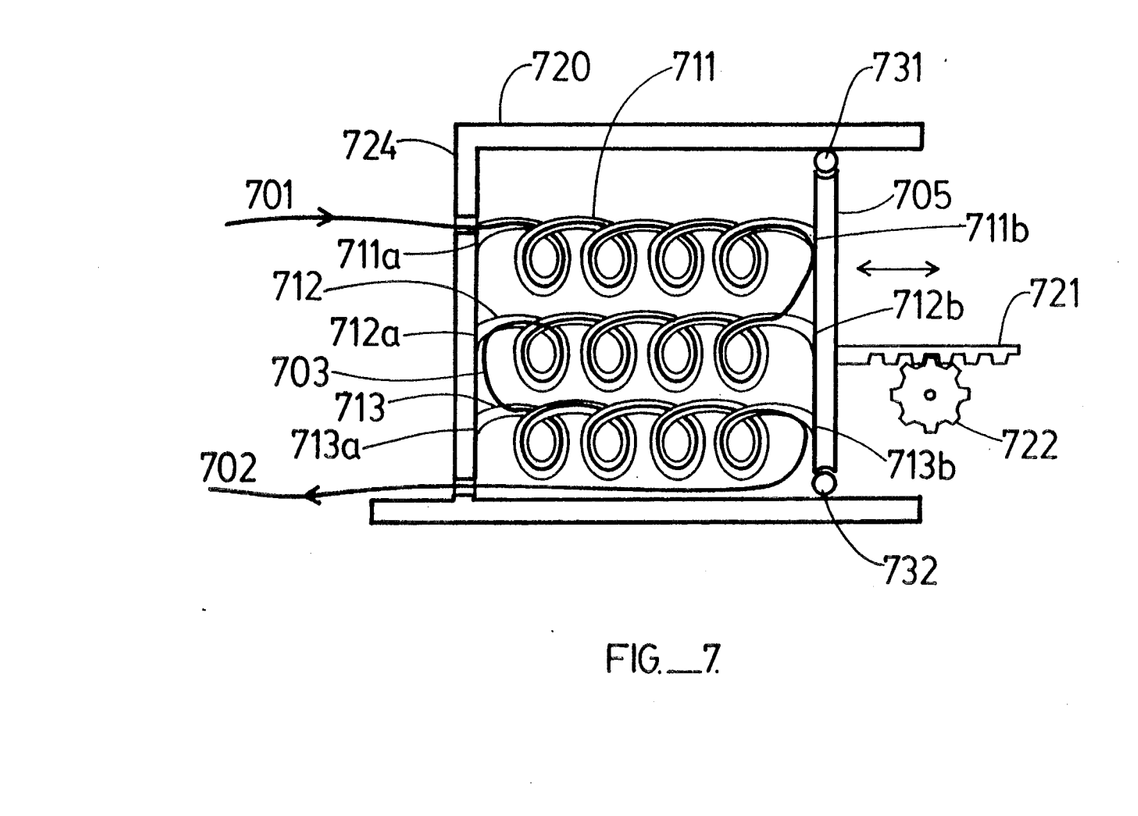
FIG. 7 is an illustration of a fifth embodiment of the present invention for randomizing the state of polarization of an optical signal within an optical fiber.

FIG. 7 is a side view of a fifth embodiment of the present invention. An optical fiber 703 with an input end 701 and an output end 702 is attached to each of three soft springs 711, 712, and 713 along their helical paths, respectively. One end of each of the springs, 711a, 712a, and 713a is secured to one wall 724 of the enclosure 720. The other end of each of the springs, 711b, 712b, and 713b is bonded to a moving wall 705. The moving wall 705 is driven by an assembly of a linear guide 721 and gear 722. As the moving wall 705 moves back and forth, the springs 711, 712, and 713 are compressed and expanded and the fiber 703 is thereby bent continuously. This driving mechanism provides a periodic motion to the fiber 703, which has a plurality of turns or bends. The constant periodic motion of these plurality of turns or bends causes the state of polarization of the optical signal within fiber 703 to continuously change, thereby diversifying the SOP of the output optical signal. Additionally, two rolling balls 731 and 732 are used to reduce the friction between the moving wall 705 and the enclosure 720.

The number of springs shown in FIG. 7 is for illustrative purposes only. Additional or fewer numbers of springs may be used so long as the fiber 703 has a sufficient number of bends to substantially diversify the SOP of the optical signal as the springs are compressed and expanded.

Although several preferred embodiments of this invention have been described in detail herein with reference to the accompanying drawings, it is to be understood that the invention is not limited to these precise embodiments, and at various changes and modifications may be affected therein by one skilled in the art without departing from the scope or spirit of the invention as defined in the appended claims.

What is claimed:

1. An apparatus for randomizing a state of polarization of an optical signal carried in an optical fiber, said apparatus comprising a state of polarization randomizing device connected to said optical fiber for continuously inducing a change in stress in said fiber sufficient to continuously and randomly alter the state of polarization of said optical signal within said optical fiber such that the distribution of the state of polarization of said optical signal is substantially diversified over a time interval which is measurable by an optical detector.

2. An apparatus for randomizing a state of polarization of an optical signal comprising:
   an optical fiber through which the optical signal propagates; and
   a state of polarization randomizing device connected to said optical fiber for continuously inducing changing stress in said fiber sufficient to continuously and randomly alter the state of polarization of said optical signal within said optical fiber such that the distribution of the state of polarization of said optical signal is substantially diversified over a time interval which is measurable by an optical detector.

3. The apparatus of claim 2 wherein said optical fiber comprises a plurality of bends through which said optical signal propagates; and
   wherein said randomizing device is connected to said plurality of bends in a manner so as to enable said device to induce motion in at least a portion of said bends sufficient to continuously and randomly alter the state of polarization of said optical signal.

4. The apparatus of claim 3 wherein at least a portion of said plurality of bends form a plurality of fiber coils.

5. The apparatus of claim 4 wherein said each of said plurality of fiber coils includes at least one loop.

6. The apparatus of claim 4 wherein said plurality of fiber coils includes a first portion of fiber coils having a first diameter and a second portion of fiber coils having a second diameter.

7. The apparatus of claim 4 wherein said plurality of fiber coils are substantially circular in shape.

8. The apparatus of claim 4 wherein said plurality of fiber coils are substantially helical in shape.

9. The apparatus of claim 3 wherein said randomizing device includes fluid dynamic means for causing fluid to induce said motion in said plurality of bends.

10. The apparatus of claim 2 wherein said optical fiber is a single mode fiber.

11. The device of claim 2 wherein said fiber is a depressed-clad or matched-clad, single mode fiber.

12. In a system for measuring polarization dependent loss (PDL) of an optical signal including a first optical fiber carrying an input optical signal to an optical device under test, and a second optical fiber optically connected to said device under test and carrying an output optical signal from said device under test to an optical detector, wherein each of said first and second optical fibers may effect a change in a state of polarization of the respective optical signal passing through it, and wherein said device under test introduces a first polarization dependent loss of said optical signal as said input optical signal passes into said device under test, and wherein said optical detector introduces a second polarization dependent loss of said optical signal as said output optical signal passes into said optical detector, an apparatus comprising:

a state of polarization randomizing device connected to said second optical fiber for continuously inducing changing stress in said second fiber sufficient to continuously and randomly alter the state of polarization of said output optical signal such that the distribution of the state of polarization of the output optical signal is substantially diversified over a time interval, thereby normalizing said second polarization dependent loss in order to more accurately measure said first polarization dependent loss.

13. The apparatus of claim 12 wherein said second optical fiber comprises a plurality of bends through which said optical signal propagates; and wherein said randomizing device is connected to said plurality of bends and further induces motion in at least a portion of said bends sufficient to continuously and randomly alter the state of polarization of said output optical signal.

14. A method for randomizing a state of polarization of an optical signal carried in an optical fiber, said optical signal having an electric vector (E) with an x-component ($E_x$) and a y-component ($E_y$), wherein a phase difference ($\Phi$) between said $E_x$ and $E_y$ components determines the state of polarization of said optical signal, said method comprising the steps of:

(a) forming a plurality of bends in at least a portion of said optical fiber; and (b) continuously inducing changing stress in at least a portion of said bends sufficient to continuously and randomly alter the state of polarization of said optical signal within said optical fiber such that a distribution of the state of polarization of said optical signal is substantially diversified over a time interval which is measurable by an optical detector.

15. The method of claim 14 wherein said stress inducing step includes the step of causing a fluid to continuously induce said motion in said plurality of bends.

16. The method of claim 14 wherein said stress inducing step includes the step of inducing a substantially periodic motion in at least a portion of said plurality of bends, wherein said induced periodic motion in said plurality of bends causes a continual alteration of the phase difference between the $E_x$ and $E_y$ components of the optical signal, thereby causing the distribution of the state of polarization of said optical signal to be substantially diversified over said time interval.

17. The method of claim 14 wherein said stress inducing step includes the step of inducing an irregular or erratic motion in at least a portion of said plurality of bends, wherein said induced irregular motion in said plurality of bends causes a continual alteration of the phase difference between the $E_x$ and $E_y$ components of the optical signal, thereby causing the distribution of the state of polarization of said optical signal to be substantially diversified over said time interval.

18. The method of claim 14 wherein said forming step comprises the step of forming a plurality of fiber coils out of at least a portion of said optical fiber.

19. The method of claim 14 wherein said forming step comprises the step of forming a plurality of shapes out of at least a potion of said optical fiber, said plurality of shapes forming step including the step of forming a first shape having dimensions which differ from a second shape.

20. The method of claim 14 wherein said stress inducing step includes the step of continually altering the phase difference between the $E_x$ and $E_y$ components of the optical signal to thereby cause the distribution of the state of polarization of said optical signal to be substantially diversified over said time interval.

21. In a system for measuring polarization dependent loss (PDL) of an optical signal including a first optical fiber carrying an input optical signal to an optical device under test, and a second optical fiber optically connected to said device under test and carrying an output optical signal from said device under test to an optical detector, wherein each of said first and second optical fibers may effect a change in a state of polarization of the respective optical signal passing through it, and wherein said device under test introduces a first polarization dependent loss of said optical signal as said input optical signal passes into said device under test, and wherein said optical detector introduces a second polarization dependent loss of said optical signal as said output optical signal passes into said optical detector, a method for improving measurement accuracy of the first polarization dependent loss, said method comprising the step of continuously inducing changing stress in said second fiber sufficient to continuously and randomly alter the state of polarization of said output optical signal such that the distribution of the state of polarization of the output optical signal is substantially diversified over a time interval, thereby normalizing said second polarization dependent loss in order to more accurately measure said first polarization dependent loss.

22. The method of claim 21 wherein said stress inducing step includes the steps of:

(a) forming a plurality of bends in at least a portion of said second optical fiber; and (b) continuously inducing motion in at least a portion of said bends sufficient to continuously and randomly alter the state of polarization of said optical signal within said second optical fiber such that the distribution of the state of polarization of said optical signal is substantially diversified over a time interval which is measurable by an optical detector, thereby normalizing said second polarization dependent loss in order to more accurately measure said first polarization dependent loss.

* * * * *